United States Patent
Alharbi (10) Patent No.: US 11,591,512 B2
(45) Date of Patent: Feb. 28, 2023

(54) USING ACIDIC BALLS FOR ACID STIMULATION IN CARBONATE RESERVOIRS

(71) Applicant: Saudi Arabian Oil Company, Dhahran (SA)

(72) Inventor: Ayman Nezar Alharbi, Udhailyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/201,600

(22) Filed: Mar. 15, 2021

(65) Prior Publication Data
US 2022/0290040 A1  Sep. 15, 2022

(51) Int. Cl.
| | |
|---|---|
| E21B 43/27 | (2006.01) |
| C09K 8/74 | (2006.01) |
| C09K 8/60 | (2006.01) |
| C09K 8/40 | (2006.01) |
| C09K 8/54 | (2006.01) |
| E21B 43/11 | (2006.01) |
| C09K 8/70 | (2006.01) |

(52) U.S. Cl.
CPC ............... *C09K 8/74* (2013.01); *C09K 8/40* (2013.01); *C09K 8/54* (2013.01); *C09K 8/601* (2013.01); *C09K 8/602* (2013.01); *C09K 8/70* (2013.01); *E21B 43/11* (2013.01); *E21B 43/27* (2020.05); *C09K 2208/32* (2013.01)

(58) Field of Classification Search
CPC ... C09K 8/74; C09K 8/40; C09K 8/54; C09K 8/601; C09K 8/902; C09K 8/70; C09K 2208/32; E21B 43/27; E21B 43/11
See application file for complete search history.

(56) References Cited

U.S. PATENT DOCUMENTS

| | | | |
|---|---|---|---|
| 5,515,924 A | 5/1996 | Osterhoudt, III | |
| 7,647,964 B2 | 1/2010 | Akbar et al. | |
| 2004/0099418 A1* | 5/2004 | Behrmann | E21B 43/04 |
| | | | 166/312 |
| 2007/0049501 A1* | 3/2007 | Saini | C09K 8/512 |
| | | | 507/260 |
| 2008/0142220 A1* | 6/2008 | Hoefer | C09K 8/516 |
| | | | 166/282 |
| 2017/0145303 A1* | 5/2017 | Fontenelle | C09K 8/92 |

(Continued)

FOREIGN PATENT DOCUMENTS

AU  2010212653  7/2014

OTHER PUBLICATIONS

"Acid Sticks," S Packaging, available from URL <http://selectindustries.com>, 2021, 2 pages.

(Continued)

*Primary Examiner* — Silvana C Runyan (74) *Attorney, Agent, or Firm* — Fish & Richardson P.C.

(57) ABSTRACT

A method for acid treatment of a wellbore in a carbonate formation is provided. The method includes dropping spacer solids into the well to fill the wellbore to perforations in a casing, dropping acidic solids into the wellbore on the top of the spacer solids, allowing the acidic solids to dissolve on top of the spacer solids forming an acidic solution, and injecting water into the wellbore to force the acidic solution into the carbonate formation.

21 Claims, 8 Drawing Sheets

(56) References Cited

U.S. PATENT DOCUMENTS

2020/0040713 A1* 2/2020 Coon ................ E21B 33/1204
2020/0123873 A1* 4/2020 Sherman ................ E21B 33/13

OTHER PUBLICATIONS

Bybee, "Acid Placement and Diversion," SPE-610-0053-JPT, Society of Petroleum Engineers (SPE), Journal of Petroleum Technology (JPT), Jun. 1, 2010, 62:06 (53-54), 2 pages.

jandjsolutionsllc.com [online], "Acid Max," retrieved from URL <http://jandjsolutionsllc.com/products/soap-sticks/acid-max/> retrieved on Feb. 22, 2021, 2 pages.

Muecke, "Principles of Acid Stimulation," SPE-10038-MS, Society of Petroleum Engineers (SPE), presented at the International Petroleum Exhibition and Technical Symposium, Beijing, China, Mar. 17-24, 1982, 13 pages.

* cited by examiner

USING ACIDIC BALLS FOR ACID STIMULATION IN CARBONATE RESERVOIRS

TECHNICAL FIELD

The present disclosure is directed to acid stimulation in production wells in carbonate.

BACKGROUND

Oil reservoirs are often found in marine sedimentary layers, such as carbonates. Carbonate reservoirs may lack porosity and permeability, forming what is termed a tight formation. Acid stimulation is a common practice to enhance the well productivity of carbonate reservoirs. To begin, injection testing with water is performed to confirm that the acid can reach the formation and open channels in the rock. Otherwise, if stable injection is not possible, acid cannot be pumped as it may exceed the acid inhibition time, and damage the tubulars of the well, potentially causing a well integrity risk.

Improving flow into the reservoir, if injection testing indicates that stable injection is not achieved, may involve spotting and squeezing acid across the target formation using coiled tubing. In some case, extra perforation intervals may also be added. Both options are expensive and slow down the progress of the well completion.

SUMMARY

An exemplary method for acid treatment of a wellbore in a carbonate formation. The method includes dropping spacer solids into the well to fill the wellbore to perforations in a casing, dropping acidic solids into the wellbore on the top of the spacer solids, allowing the acidic solids to dissolve on top of the spacer solids forming an acidic solution, and injecting water into the wellbore to force the acidic solution into the carbonate formation.

DETAILED DESCRIPTION

Methods are provided herein for acid stimulation of wells into carbonate formations using solid acid delivery systems. Chemical delivery systems using solids, termed soap sticks, have been used to deliver well treatment chemicals, such as foaming agents used for unloading water from a well bore. Other solid delivery systems have been used to deliver acids for removing scale deposits from injection wells. Solid balls have been used in oil and gas wells as a mechanical way to isolate stages in multistage fracturing (MSF) liners and ball-activated plugs in diverter valves.

Techniques described herein provide acidic balls that either have a solid form or are a liquid acid solution encapsulated in a material that will disintegrate in a well, such as a metal or alkane compound (wax). Spacer balls are dropped into a vertical well with a low injection rate to fill the well to the level of perforations in the wellbore leading to the carbonate formation. The acidic balls are then dropped into the vertical well. The balls disintegrate in downhole conditions, for example, when exposed to high pressure and temperature. The acid mixes with aqueous solutions in the wellbore forming an acidic solution proximate to the perforations. Water is then pumped into the wellbore to squeeze the acidic mixture into the formation to react with the formation and create channels to improve the injection rate.

Figure 1:
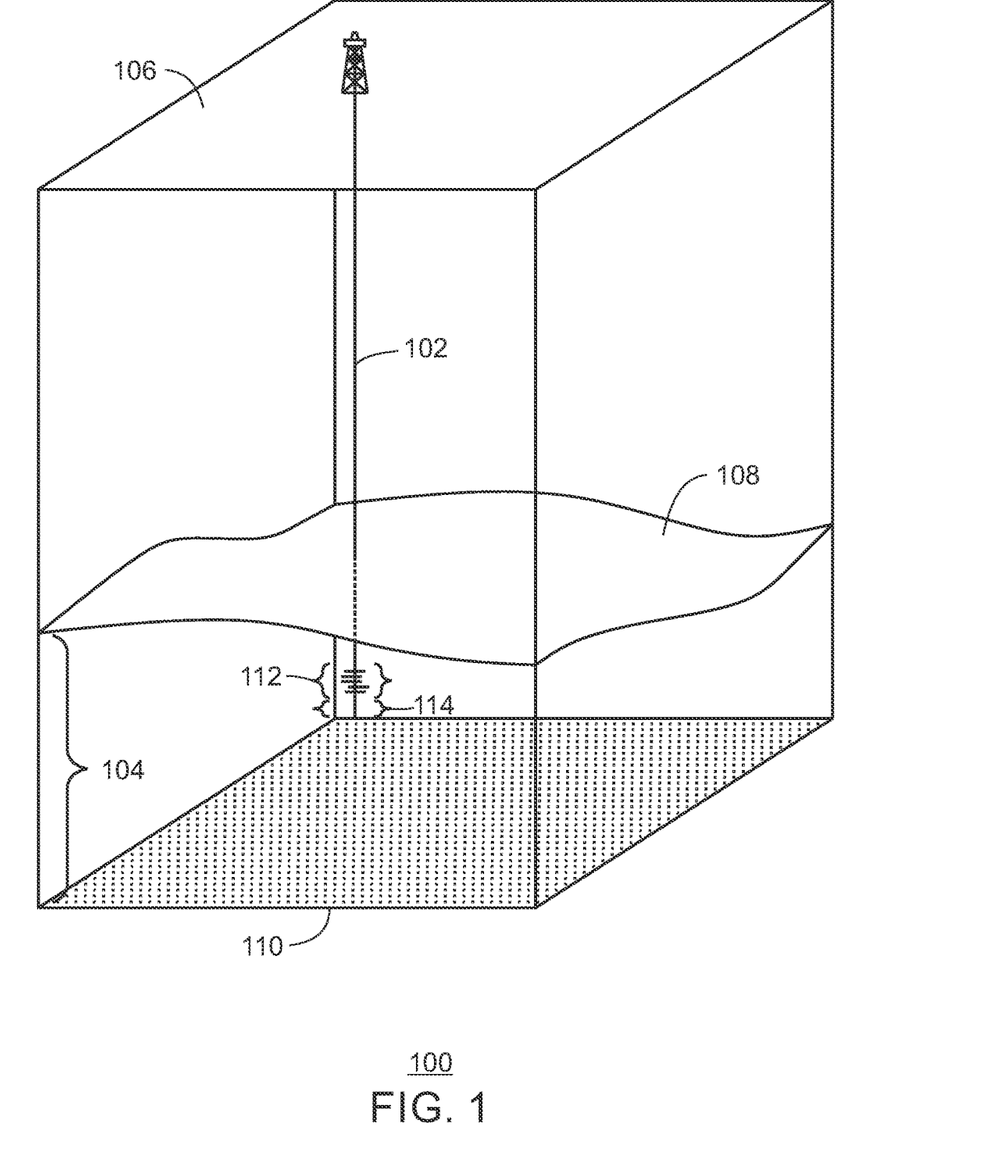
FIG. 1 is a schematic diagram of a wellbore showing an acidic well stimulation treatment.

FIG. 1 is a schematic drawing 100 of a wellbore 102 drilled to a carbonate formation 104 from the surface 106. The carbonate formation 104 may be located between a cap rock layer 108, and a lower layer 110, such as a water layer. A perforation zone 112 includes a number of perforations, for example, made through casing that lines the wellbore 102 and into the carbonate formation 104. In some embodiments, an unperforated section of the wellbore, termed a rathole 114, lies below the perforation zone 112.

The carbonate formation 104 is often stimulated with acid injected through the perforations of the perforation zone 112 to form channels into the carbonate formation 104. However, the carbonate formation 104 may be a tight formation, e.g., with very low flow rate, giving the acid time to attack the casing and other elements of the wellbore.

The use of the acidic solids, as described herein, allows the acid to be formed proximate to the perforations, lowering the exposure time to the elements of the wellbore. Once the initial acid stimulation using these solid delivery system is completed, acid stimulation by normal techniques, such as coiled tubing, may be performed.

Figure 2:
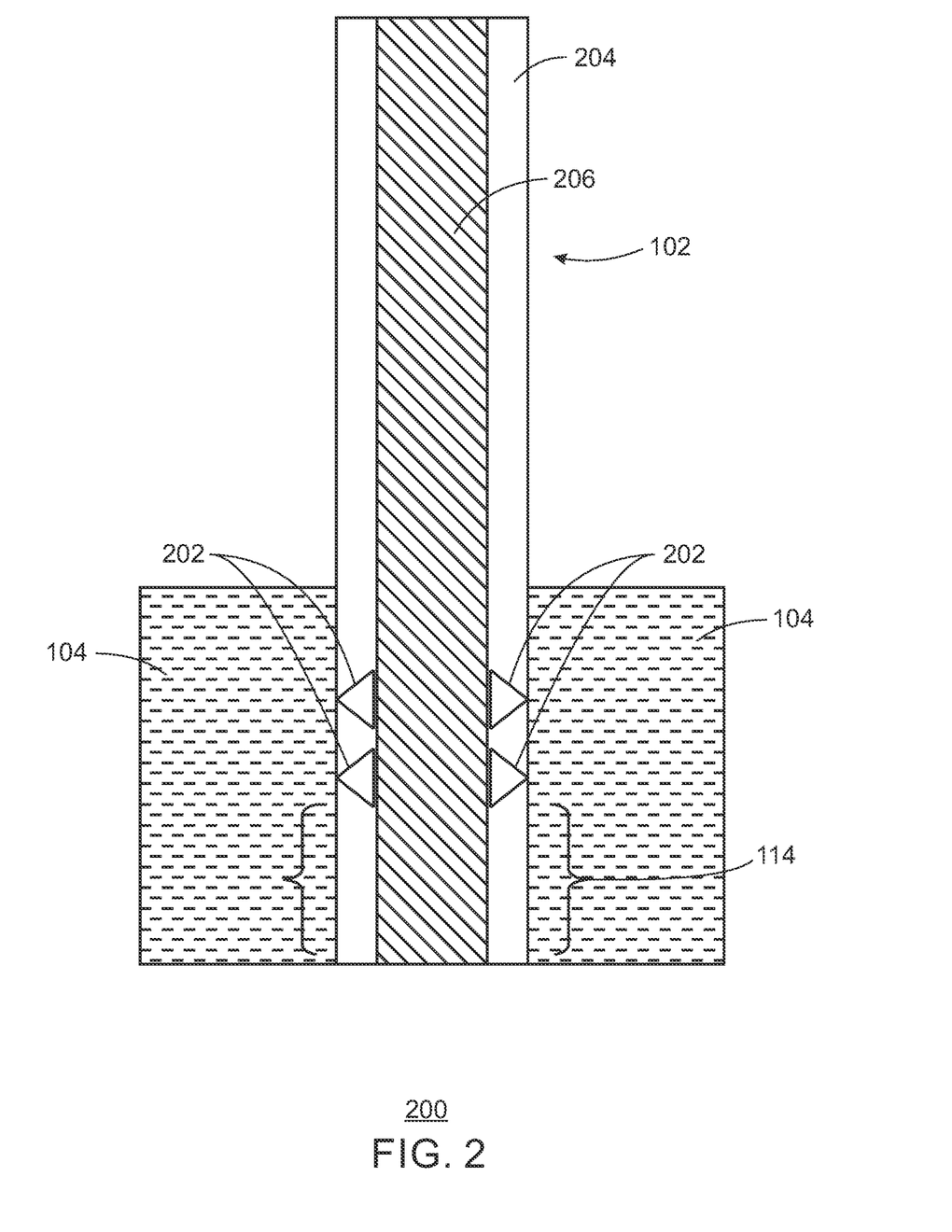
FIG. 2 is a side cross-sectional view of the wellbore into a tight carbonate reservoir.

FIG. 2 is a side cross-sectional view 200 of the wellbore 102 into the carbonate formation 104. Like numbered items are as described with respect to FIG. 1. Perforations 202 through the casing 204 fluidically couple the interior 206 of the wellbore 102 to the carbonate formation 104.

An injection test performed by injecting water through the interior 206 of the wellbore 102 may determine that the carbonate formation 104 is a "tight" formation. Accordingly, and acid stimulation procedure may not have sufficient flow to prevent damage to the wellbore 102 or the casing 204 before channels are formed through the perforations 202 into the carbonate formation.

Figure 3:
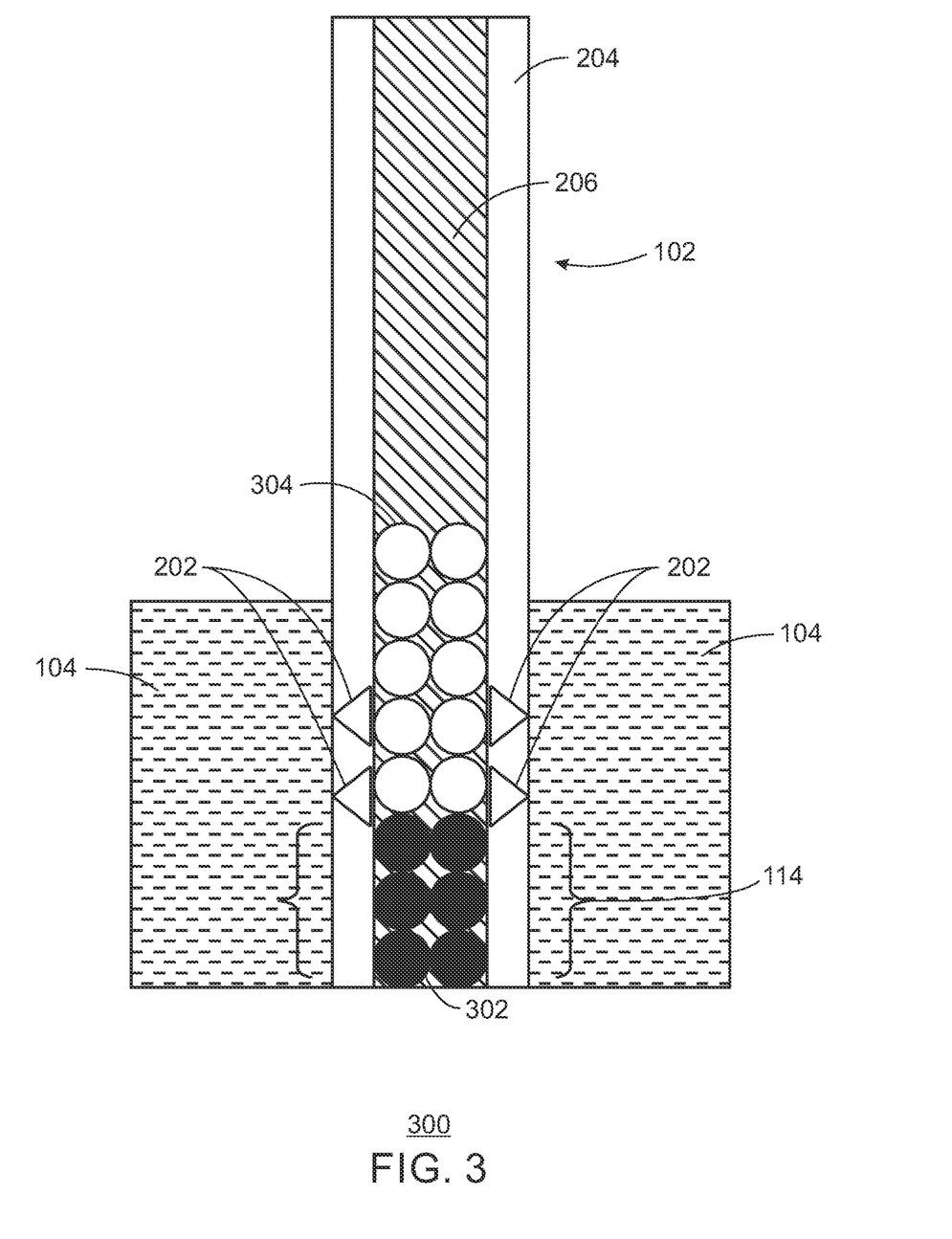
FIG. 3 is a side cross-sectional view of the wellbore after spacer balls and acidic balls have been dropped into the wellbore.

FIG. 3 is a side cross-sectional view 300 of the wellbore 102 after spacer balls 302 and acidic balls 304 have been dropped into the wellbore 102. Like numbered items are as described with respect to FIGS. 1 and 2. In some embodiments, the spacer balls 302 are dropped into the rathole 114 below the perforations 202, filling the wellbore 102 up to the level of the perforations 202. Acidic balls 304 are then dropped into the wellbore 102 to rest on top of the spacer balls 302.

The spacer balls 302 are designed to degrade in the conditions of the well. For example, the spacer balls 302 may be made from metal alloys designed to degrade over time. In some embodiments, the spacer balls 302 are made from zinc alloys, zinc/aluminum alloys, and the like. In other embodiments, the spacer balls 302 are made from surfactants that are melted and molded into spherical shapes before solidifying. The surfactants are chosen to dissolve in the elevated temperatures and aqueous solutions of the wellbore. In some embodiments, the surfactants are alkyl compounds that are terminated with polar groups, such as carboxylic acid groups, sulfonic acid groups, or polyethylene oxide chains, among many others. The length of the alkyl chain may be selected to control a melting point of the surfactant, for example, with longer alkyl chains providing higher melting points, as discussed for alkane compounds herein. In some examples, nonionic surfactants that are used include, for example, a surfactant in the Triton™ product line from Dow Chemical of Midland, Mich., USA, or a surfactant in the Span® product line from Croda International of Goole, East Yorkshire, UK, among others.

The acidic balls 304 are also designed to degrade in the well, releasing the contents. The acidic balls 304 may be formed by melting a surfactant, such as the surfactants described with respect to the spacer balls 302, and blending in other ingredients. For example, in an embodiment, an aqueous HCl solution is mixed with the melted surfactant, as described with respect to the spacer balls, along with a corrosion inhibitor. In some embodiments, the corrosion inhibitor is an organic compound, such as an aldehyde. The mixture is poured into molds and allowed to cool. In other embodiments, an acid is encapsulated in a paraffinic wax, or alkane compound, selected to melt at the temperatures of the well. For example, alkane compounds that may be selected include $C_{30}H_{62}$, with a melting point of 66° C., $C_{40}H_{82}$, with a melting point of 82° C., $C_{50}H_{102}$, with a melting point of about 91° C., $C_{60}H_{122}$, with a melting point of about 100° C., or $C_{70}H_{142}$, with a melting point of about 109° C., among others. In some embodiments, the acidic balls 304 have an acidic solution encapsulated in a metal that is slowly degraded by the acid. In some embodiments, a solid acidic compound, such as sodium bisulfate, among others, is blended into the surfactant with a corrosion inhibitor to form the acidic balls.

Figure 4:
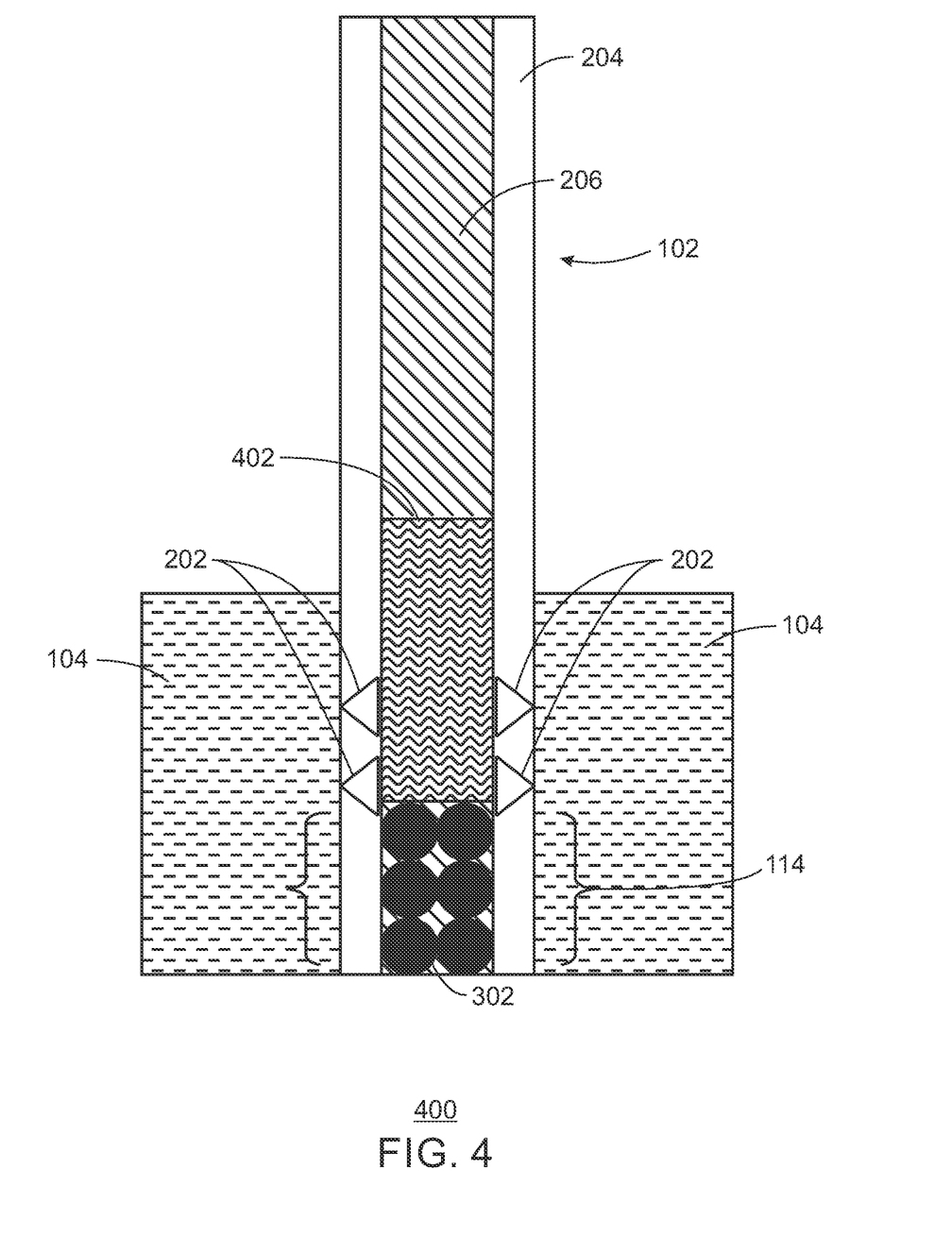
FIG. 4 is a side cross-sectional view of the wellbore after the acidic balls have dissolved forming an acidic mixture.

FIG. 4 is a side cross-sectional view 400 of the wellbore 102, after the acidic balls 304 have dissolved forming an acidic mixture 402 in the interior 206 proximate to the perforations 202. Like numbered items are as described with respect to the previous figures. The acidic mixture 402 is held in place, proximate to the perforations 202, by the spacer balls 302 that are placed below the perforations 202.

Figure 5:
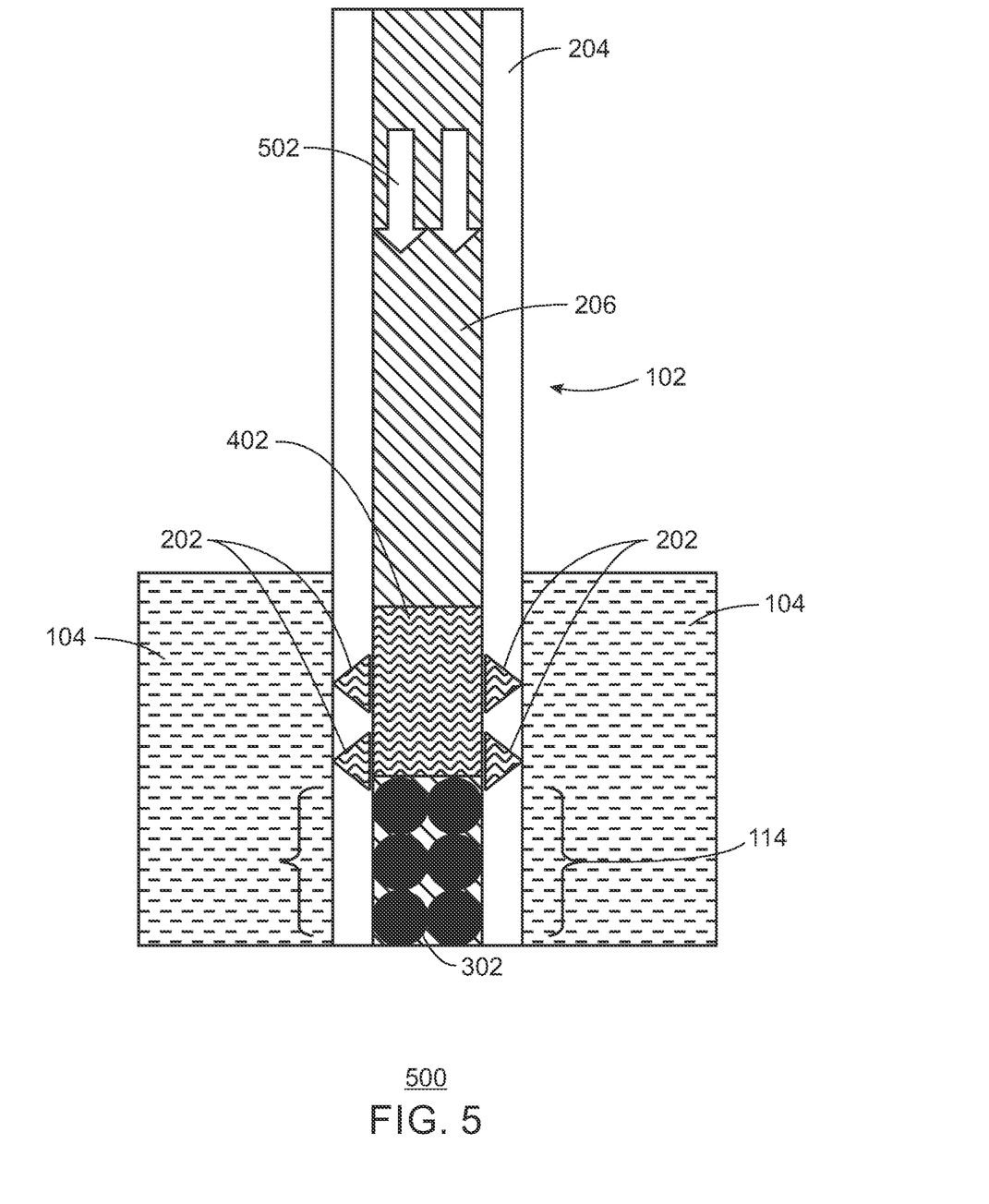
FIG. 5 is a schematic diagram of forcing the acidic mixture into the tight carbonate reservoir.

FIG. 5 is a schematic diagram 500 showing the forcing the acidic mixture 402 into the carbonate reservoir 104. Like numbered items are as described with respect to the previous figures. As water 502 is pumped from the surface through the interior 206 of the wellbore 102, the increased pressure forces the acidic mixture 402 out through the perforations 202 into the carbonate reservoir.

Figure 6:
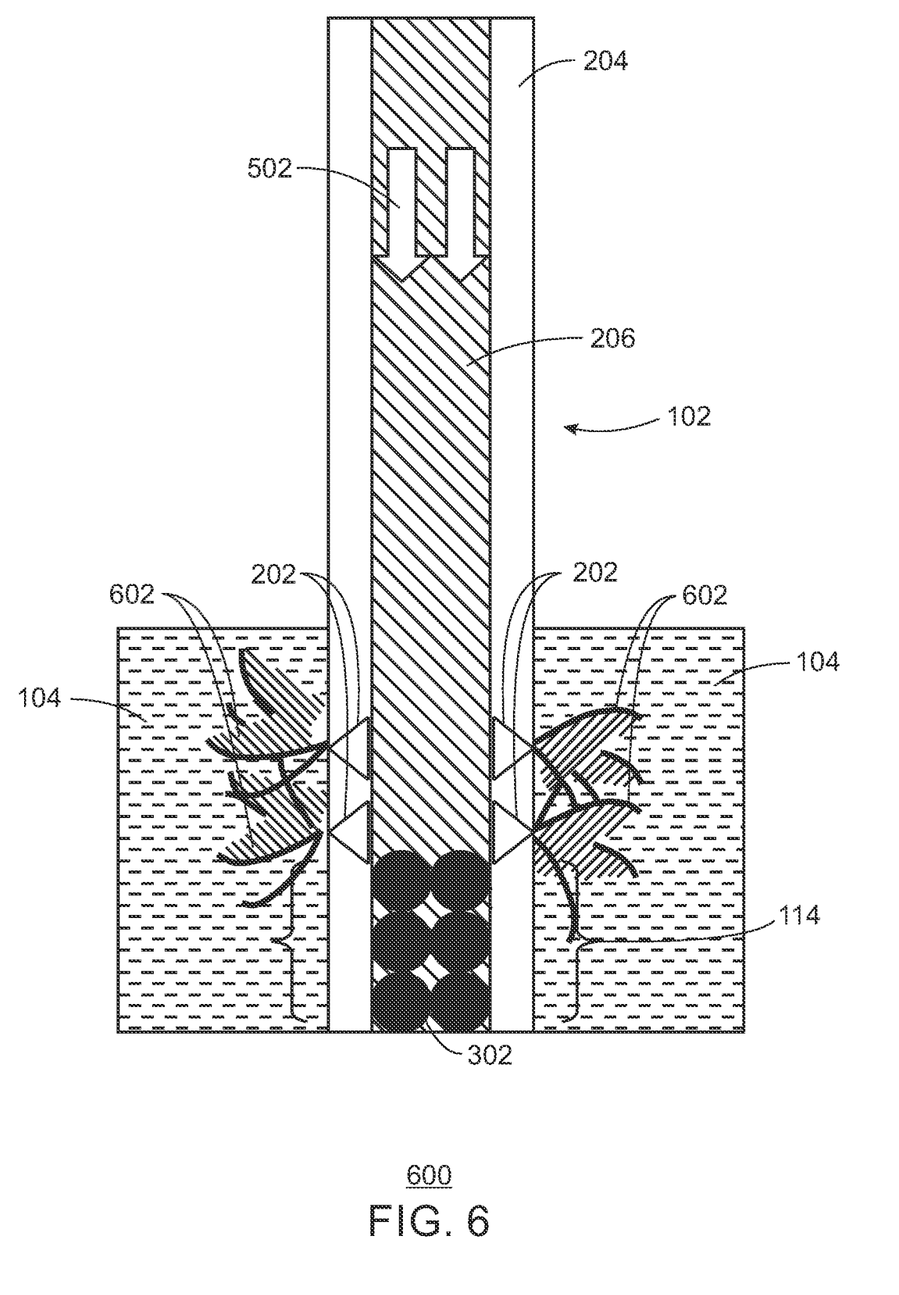
FIG. 6 is a schematic diagram of the acidic mixture reacted with the carbonate of the tight carbonate reservoir, forming channels.

FIG. 6 is a schematic diagram 600 of channels 602 formed in the carbonate of the carbonate reservoir 104, radiating outwards from the perforations 202. Like numbered items are as described with respect to the previous figures. Over time, the spacer balls 302, placed in the rathole 114, degrade and disintegrate.

Figure 7:
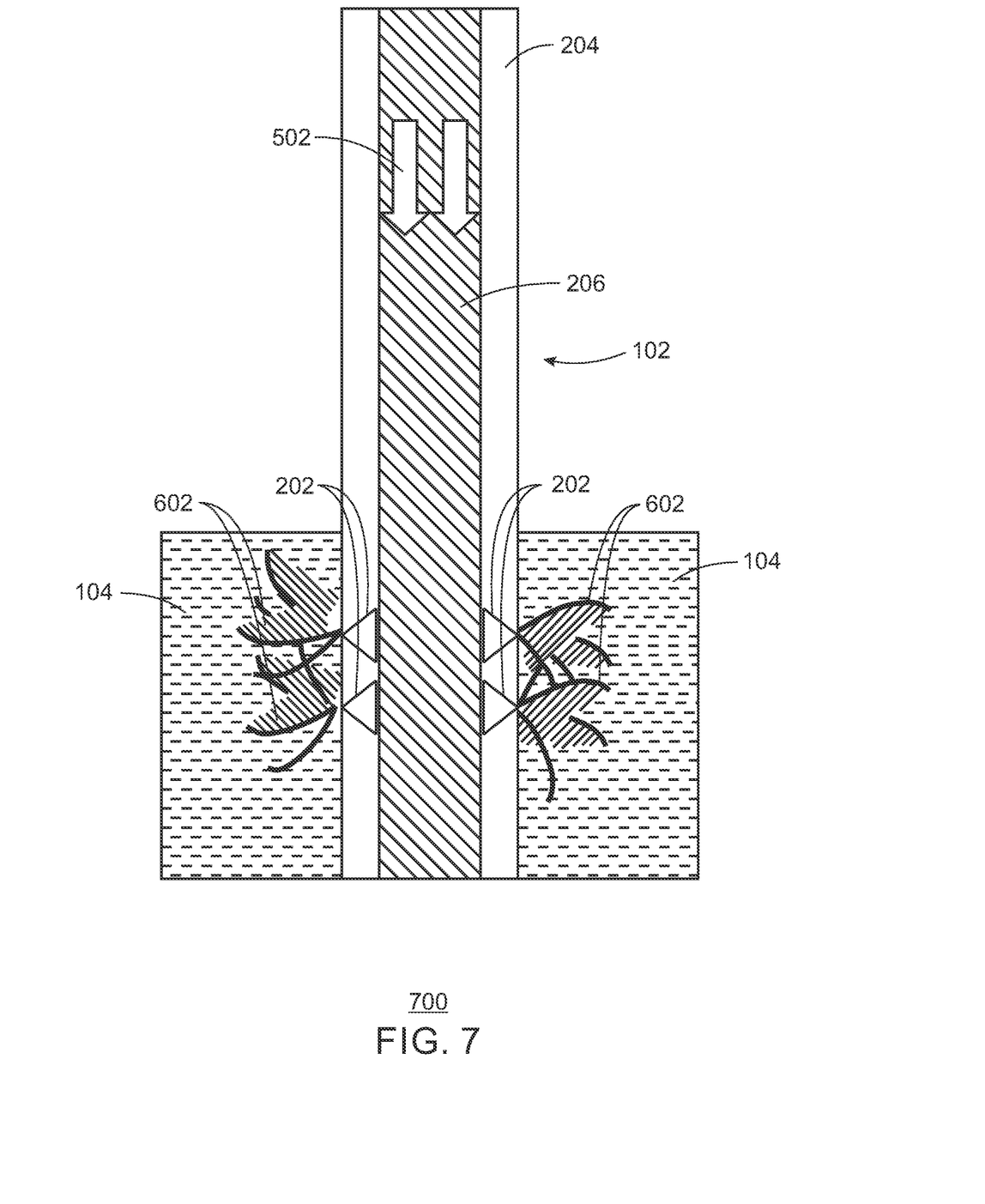
FIG. 7 is a schematic diagram of the wellbore after the spacer balls have dissolved.

FIG. 7 is a schematic diagram 700 of a pressure test of the wellbore 102 after the spacer balls 302 have disintegrated. Like numbered items are as described with respect to previous figures. As water 502 is injected into the wellbore 102 for the pressure test it flows down the interior 206 and out the perforations 202 into the carbonate formation 104. If the flow is considered sufficient, the flow may be reversed allowing the hydrocarbons from the carbonate formation 104 to push the water out of the wellbore 102 e.g., unloading the well. For example, the flow may be considered sufficient when the injection rate into the well is stable and at rate high enough to ensure quick and safe conveyance for the acid that is pumped from surface to reach the formation before exceeding the acid inhibition time, for example, an injection rate of about 3 to 5 barrels per minute, or higher. If the pressure from the hydrocarbons in the carbonate formation 104 is insufficient to unload the well, a foaming agent may be added, for example, in the form of foaming soap sticks.

The wellbore 102 may then be placed into production. If the flow is improved, but further stimulation is desirable, coiled tubing stimulation may be used to increase the amount of acid forced into the carbonate formation 104 through the perforations 202.

Figure 8:
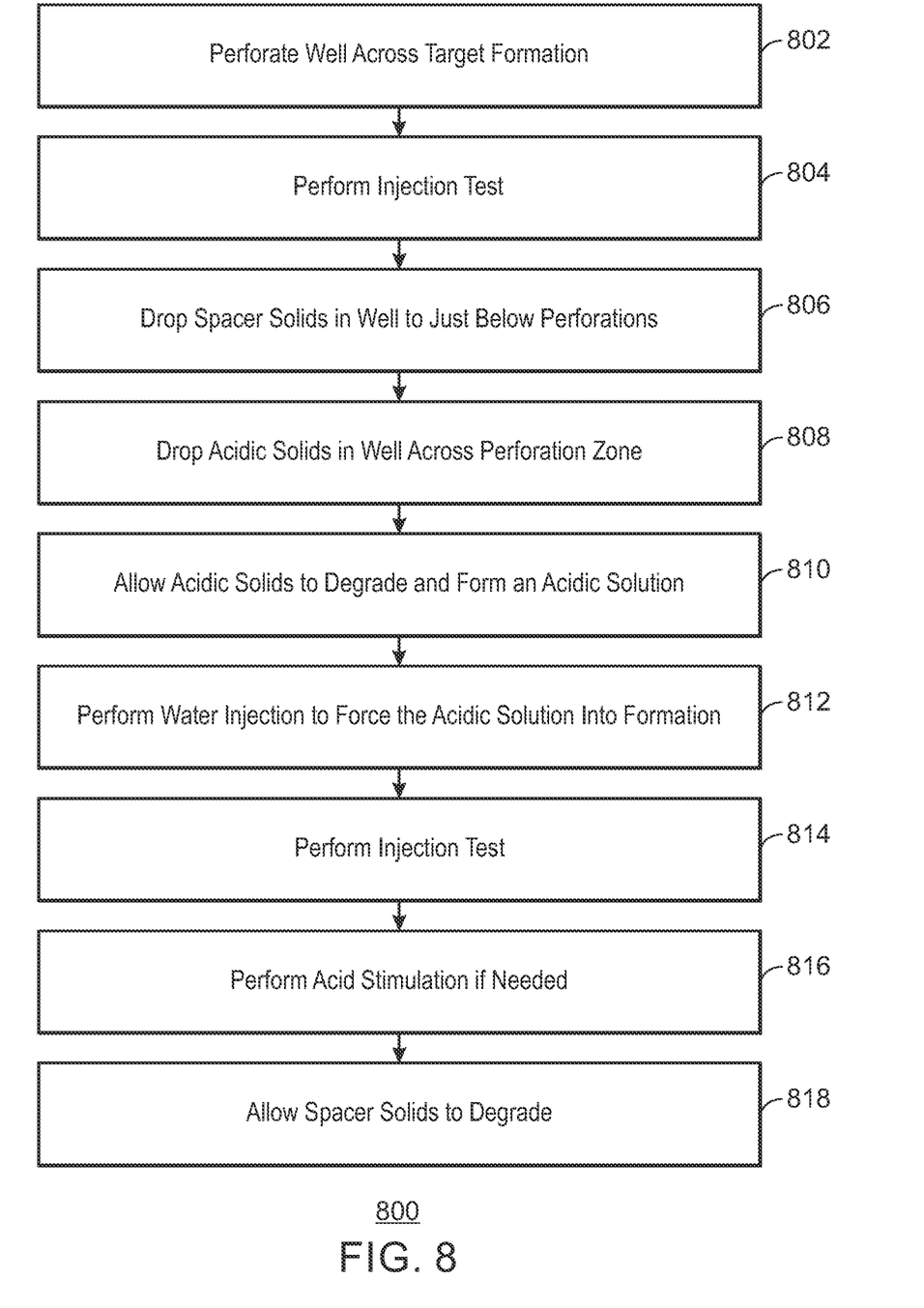
FIG. 8 is a process flow diagram of a method for using acidic balls to stimulate a tight carbonate reservoir.

FIG. 8 is a process flow diagram of a method 800 using dissolvable solids to perform an acid stimulation of a carbonate formation. The method 800 begins at block 802, when the well is perforated across the targeted zone in the carbonate formation.

At block 804, and injection test, e.g., using water, is performed. If the injection test fails, for example, due to a tight formation then acid stimulation cannot be performed without causing corrosion of the well tubulars, such as the casing, if the acid exceeds the inhibition time before it reaches the carbonate formation.

At block 806, spacer solids are dropped in the well to fill the well to just below the perforations, e.g., filling the rathole below the perforations. In some embodiments described herein, the spacer solids are spherical. The spacer solids drift down through the fluids in the wellbore until reaching the bottom.

At block 808, acidic solids are dropped in the well. In some embodiments described herein, the acidic solids are spherical. The acidic solids drift down through the fluids in the wellbore to settle on top of the spacer solids, e.g. across the pre-made perforations interval.

At block 810, the acidic solids are allowed to decompose at the temperature and pressure of the wellbore. For example, the surfactant and other ingredients may be selected to melt or dissolve over 10 hours, 5 hours, 2 hours, 1 hour, 30 minutes, or less. As the acidic solids dissolve, they form an acidic mixture in the wellbore proximate to the perforations.

At block 812, water injection is performed from the surface to force the acidic mixture into the carbonate formation through the perforations. The acidic mixture reacts with the rocks of the carbonate formation forming channels to enhance the injection and production processes, according to the following chemical reaction:

$$CaCO_3 + 2HCl \rightarrow H_2O + CO_2 + CaCl_2.$$

At block 814, another injection test is performed by pumping water from surface. If injection rate is sufficiently improved, the well may be placed into production. If the injection rate is lower than desired, at block 816, acid stimulation may be performed by repeating the treatment with the acidic solids, by using coiled tubing, or by other acid stimulation techniques.

At block 818, the spacer solids are allowed to degrade in the well. The degradation time for the spacer solids will be longer than the degradation time of the acidic solids to allow the treatment to be completed. The degradation time may be 40 hours, 20 hours, 10 hours, or less.

Exemplary Embodiments

An exemplary method for acid treatment of a wellbore in a carbonate formation. The method includes dropping spacer solids into the well to fill the wellbore to perforations in a casing, dropping acidic solids into the wellbore on the top of the spacer solids, allowing the acidic solids to dissolve on top of the spacer solids forming an acidic solution, and injecting water into the wellbore to force the acidic solution into the carbonate formation.

In an aspect, the method includes drilling a wellbore to the carbonate formation and perforating the casing at a production level.

In an aspect, the method includes testing a first injection rate into the well, and if the first injection rate is sufficient, performing acid stimulation on the well. In an aspect, the method includes testing a second rate injection after forcing the acidic solution into the formation, and if the second injection rate is sufficient, performing acid stimulation on the well.

In an aspect, the spacer solids are spherical. In an aspect, the spacer solids include a metal alloy that disintegrates in the wellbore. In an aspect, the spacer solids include a surfactant that dissolves in the wellbore. In an aspect, the spacer solids include an alkane compound that melts at a temperature of the wellbore.

In an aspect, the acidic solids are spherical. In an aspect, the acidic solids include a surfactant mixed with an acid. In an aspect, the acid is hydrochloric acid. In an aspect, the acid is a solid that dissolves in water. In an aspect, the acidic solids include a corrosion inhibitor. In an aspect, the corrosion inhibitor is an aldehyde.

In an aspect, the acidic solids include an acidic solution encapsulated in an alkane compound. In an aspect, the alkane compound melts at a temperature of the carbonate formation. In an aspect, the acidic solids include an acidic solution encapsulated in a metal that disintegrates, releasing the acid solution.

In an aspect, the method includes allowing the spacer solids to disintegrate. In an aspect, the spacer solids disintegrate at elevated temperature in an aqueous environment. In an aspect, the spacer solids disintegrate when exposed to the acidic solution.

In an aspect, the method includes performing acid stimulation by a coiled tubing injection.

Other implementations are also within the scope of the following claims.

What is claimed is:

1. A method for acid treatment of a wellbore in a carbonate formation, comprising:
    dropping spacer solids into the well to fill the rathole of a wellbore up to a perforation zone, wherein the rathole comprises an unperforated section of a wellbore, and wherein the perforations in the perforation zone are made through a casing and into the carbonate formation;
    dropping acidic solids into the wellbore on the top of the spacer solids;
    allowing the acidic solids to dissolve on top of the spacer solids forming an acidic solution proximate to the perforations in the wellbore; and
    injecting water into the wellbore to force the acidic solution into the carbonate formation.

2. The method of claim 1, comprising:
    drilling a wellbore to the carbonate formation; and
    perforating the casing at a production level.

3. The method of claim 1, comprising performing an injection test on the well before dropping the spacer solids into the well.

4. The method of claim 1, comprising performing an injection test after forcing the acidic solution into the carbonate formation.

5. The method of claim 1, wherein the spacer solids are spherical.

6. The method of claim 1, wherein the spacer solids comprise a metal alloy that disintegrates in the wellbore.

7. The method of claim 1, wherein the spacer solids comprise a surfactant that dissolves in the wellbore.

8. The method of claim 1, wherein the spacer solids comprise an alkane compound that melts at a temperature of the wellbore.

9. The method of claim 1, wherein the acidic solids are spherical.

10. The method of claim 1, wherein the acidic solids comprise a surfactant mixed with an acid.

11. The method of claim 10, wherein the acid is hydrochloric acid.

12. The method of claim 10, wherein the acid is a solid that dissolves in water.

13. The method of claim 10, wherein the acidic solids comprise a corrosion inhibitor.

14. The method of claim 13, wherein the corrosion inhibitor is an aldehyde.

15. The method of claim 1, wherein the acidic solids comprise an acidic solution encapsulated in an alkane compound.

16. The method of claim 15, wherein the alkane compound melts at a temperature of the carbonate formation.

17. The method of claim 1, wherein the acidic solids comprise an acidic solution encapsulated in a metal that disintegrates, releasing the acid solution.

18. The method of claim 1, comprising performing acid stimulation by a coiled tubing injection.

19. The method of claim 1, comprising allowing the spacer solids to disintegrate.

20. The method of claim 19, wherein the spacer solids disintegrate at elevated temperature in an aqueous environment.

21. The method of claim 19, wherein the spacer solids disintegrate when exposed to the acidic solution.

* * * * *